United States Patent
Fan et al.

(10) Patent No.: US 10,881,103 B2
(45) Date of Patent: Jan. 5, 2021

(54) BIOCIDE-ENCAPSULATED MICROCAPSULE FOR USE IN PAINT

(71) Applicant: NATIONAL CHUNG SHAN INSTITUTE OF SCIENCE AND TECHNOLOGY, Taoyuan (TW)

(72) Inventors: Ching-Wen Fan, Taoyuan (TW); Wei-Heng Huang, Taoyuan (TW); Mu-Ni Hsu, Taoyuan (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 194 days.

(21) Appl. No.: 15/804,244

(22) Filed: Nov. 6, 2017

(65) Prior Publication Data
US 2019/0133120 A1    May 9, 2019

(51) Int. Cl.
| | |
|---|---|
| *A01N 25/28* | (2006.01) |
| *A01N 43/80* | (2006.01) |
| *C09D 5/14* | (2006.01) |
| *C09D 7/65* | (2018.01) |
| *C09D 7/63* | (2018.01) |
| *C09D 7/40* | (2018.01) |

(52) U.S. Cl.
CPC .............. *A01N 25/28* (2013.01); *A01N 43/80* (2013.01); *C09D 5/14* (2013.01); *C09D 7/40* (2018.01); *C09D 7/63* (2018.01); *C09D 7/65* (2018.01)

(58) Field of Classification Search
CPC ...... A01N 25/28; C09D 5/14; B01J 13/14–22
See application file for complete search history.

(56) References Cited

U.S. PATENT DOCUMENTS

| | | | |
|---|---|---|---|
| 6,365,066 B1 | 4/2002 | Podszun et al. | |
| 6,451,953 B1* | 9/2002 | Albright | C08F 2/22 526/306 |
| 2007/0215000 A1* | 9/2007 | Reybuck | A01N 43/80 106/18.33 |

FOREIGN PATENT DOCUMENTS

WO    WO 2015/164059    * 10/2015    ............... C09D 5/14

OTHER PUBLICATIONS

Ferguson (Core-Shell Polymers from Styrene and Vinyl Acetate for Use as Wood Adhesives, Graduate Thesis, 2000, University of Cantebury, Christchurch, New Zealand, section 3.7, pp. 86-89).*
Patent Application of Sarah E. Reybuck and Curtis Schwartz for Blends of Encapsulated Biocides—U.S. Appl. No. 60/782,990.

* cited by examiner

*Primary Examiner* — Kortney L. Klinkel
(74) *Attorney, Agent, or Firm* — Schmeiser, Olsen & Watts, LLP

(57) ABSTRACT

A biocide-encapsulated microcapsule for use in paint includes a hydrophobic core formed by polymerization of a hydrophobic monomer comprising an unsaturated bond in presence of a free radical initiator; a cross-linking hydrophilic shell adapted to enclose the hydrophobic core and formed by polymerization of a hydrophilic monomer comprising an unsaturated bond and another cross-linking agent; and a biocide being a hydrophobic compound. The hydrophobic core and the cross-linking hydrophilic shell enclose the dispersed biocide. Therefore, the biocide is released from the microcapsule core in the long term such that a resultant dried paint prevents biofouling in the long term.

4 Claims, 5 Drawing Sheets

BIOCIDE-ENCAPSULATED MICROCAPSULE FOR USE IN PAINT

FIELD OF THE INVENTION

The present invention relates to biocide-encapsulated microcapsules and, more particularly, to a biocide-encapsulated microcapsule for use in paint.

BACKGROUND OF THE INVENTION

Infestation by marine organisms on the surface of an underwater part of a ship's hull coarsens the surface of the underwater part of the ship's hull and thus increases frictional resistance, leading to a marked decrease in the speed at which the ship is advancing and an increase in the fuel consumption. The marine organisms are also likely to infest and clog a cooling system of the ship, leading to engine failure. Secretions of the marine organisms are corrosive to ship paint and steel plates of the ship's hull, thereby further speeding up the corrosion of the underwater part of the ship's hull. Therefore, prevention of the infestation by marine organisms is of vital importance to the shipping industry.

Maritime vessel antifouling technologies often use heavy metals as antifouling agents. For instance, in the 1960s, the United States Navy used mercuric chloride and zinc oxide as antifouling agents, whereas fishing boats and freighters used antifouling paint which contains tributyltin (TBT). TBT-containing antifouling paint predisposes marine organisms to gene mutations. From Jan. 1, 2008, organic tin-containing antifouling paints are banned and replaced by heavy metals of lower ecotoxicity, such as copper (I) oxide. However, when overused, copper (I) oxide is still harmful to the environments.

As regards releases of biocides, biocides not microencapsulated abound in paint and react with plastic adhesives, resulting in an increase of paint viscosity and changes of the physical properties of paint to the detriment of painting. Furthermore, biocides not microencapsulated may mix with liquid paint and is eventually released from the dried paint as soon as it is of low concentration. The sudden release of highly concentrated biocides into the surroundings causes a waste of biocides and environmental pollution. Afterward, the concentration of the biocides drops quickly, and in consequence ensuing releases of biocides render their concentration lower than effective concentration. As a result, the biocides end up with invalid concentration, as shown in FIG. 1.

The U.S. patent application 60/782,990 is directed to biocide microcapsules and discloses changing the chemical properties, particle size, shell thickness, and extent of shell cross-linking of a microcapsule shell with a view to regulating the release rate of the releases of biocides from the microcapsules. U.S. Pat. No. 6,365,066 discloses forming polymers from a microencapsulated biocide and polymers and various applications thereof. However, the aforesaid prior art fails to ensure effective antibacterial concentration of biocides and long-term sterilization by biocides after the biocides are released from paint; as a result, the aforesaid prior art is not effective in controlling the growth of microorganism.

In view of the aforesaid drawbacks of the prior art, the present invention puts forth a biocide-encapsulated microcapsule for use in a paint to ensure long-term releases of a microencapsulated biocide from a microcapsule core and thereby ensure the biocide in the dried paint has an effective biocide concentration over a long period time, so as to prevent biofouling in the long term.

SUMMARY OF THE INVENTION

It is an objective of the present invention to provide a biocide-encapsulated microcapsule for use in a paint such that a core-shell structure of the polymeric microcapsules ensures slow and appropriately slight releases of the microencapsulated biocide from the microcapsule core and thereby persistent effective concentration of biocide in the dried paint with a view to preventing biofouling in the long term.

A biocide-encapsulated microcapsule for use in paint according to the present invention is characterized in that single-stage or multi-stage polymerization and cross-linking is carried out to allow concentrated biocide to be enclosed by a microcapsule core, and that the biocide-encapsulated microcapsule comprises a hydrophobic biocide which does not dissolve in an aqueous solution and thus is not released massively to the surroundings. The biocide comprises at least a hydrophobic compound or a combination thereof with water solubility of less than 2 wt % (preferably less than 1 wt %), for example, 2-octyl-3(2H)-isothiazolone (OIT), benzisothiazolin (BIT), 4,5-dichloro-2-n-octyl-3(2H)-isothiazolone (DCOIT), or any other alkane, to microcapsulize its analogs and derivatives, thereby widening the application of the biocide-encapsulated microcapsule to shipping paint for preventing biofouling.

A biocide-encapsulated microcapsule for use in paint according to the present invention prevents biofouling. Owing to a limit in the thickness of paint coatings, particle size of biocide-encapsulated antifouling microcapsules for use in paint has to be less than 5 µm (preferably less than 500 nm), otherwise the microcapsules will lead to deterioration of denseness of the dried paint. To meet the requirement of antifouling microcapsules, the present invention discloses enclosing a biocide by emulsifier-free emulsification and polymerization and producing submicroscale microcapsules which are not only of uniform particle size and high concentration but are also solvent-resistant. Being of uniform particle size is one of the factors in enabling the microcapsules of the present invention to provide persistent releases (zero-level releases) of biocide.

The polymerization described herein entails atom-transfer radical-polymerization (ATRP), that is, using free radicals as an initiator whereby more free radicals are generated in a solution at a high temperature, say, 90° C. or higher, and then attacking unsaturated bonds of monomers in the solution with the resultant free radicals to trigger free radical-based polymerization. During the polymerization process, carbon-carbon unsaturated bonds are attacked by the free radicals to therefore form new carbon-carbon single-bond, whereas new free radicals are generated from the original unsaturated bonds as soon as the original unsaturated bonds are attacked by the free radicals. The aforesaid polymerization process continues until the solution runs out of free radicals.

The present invention is characterized in that the cross-linking agent is conducive to regulation of the cross-linking density to attain solvent resistance and control of biocide releases.

In order to achieve the above and other objectives, the present invention provides a biocide-encapsulated microcapsule for use in paint, comprising: a hydrophobic core formed by polymerization of a hydrophobic monomer comprising an unsaturated bond in the presence of a free radical initiator; and a biocide being a hydrophobic compound. The hydrophobic core encloses the dispersed biocide to effect storage and releases of the biocide.

The hydrophobic monomer comprising an unsaturated bond further undergoes polymerization with a cross-linking agent to form a cross-linking hydrophobic core. The cross-linking agent has unsaturated bonds. The hydrophobic monomer comprising an unsaturated bond further comprises a cross-linking hydrophilic shell for enclosing the hydrophobic core or the cross-linking hydrophobic core. The cross-linking hydrophilic shell is formed by polymerization of a hydrophilic monomer comprising an unsaturated bond and another cross-linking agent. The other cross-linking agent has unsaturated bonds.

The present invention further provides a biocide-encapsulated microcapsule for use in paint, comprising: a hydrophilic core formed by polymerization of a hydrophilic monomer comprising an unsaturated bond in the presence of a free radical initiator; and a biocide being a hydrophobic compound, wherein the hydrophilic core encloses the dispersed biocide to effect storage and releases of the biocide.

The present invention may also involve polymerizing a hydrophilic monomer comprising an unsaturated bond to form a hydrophilic core for enclosing a hydrophobic biocide. It is because the unsaturated bond of the hydrophilic monomer is attacked by free radicals upon completion of the polymerization to form a saturated carbon-carbon covalent bond; hence, its long-chain hydrocarbon chain end can function as a hydrophobic end and aggregate to form a core similar to a micelle. Its long-chain hydrophobic end is located inside the core, whereas its hydrophilic end group is located outside the core. The hydrophobic end inside the core encloses the hydrophobic biocide, whereas the hydrophilic end outside the core reacts with the polymer monomer of the shell, thereby forming a core-shell structure.

The hydrophilic monomer comprising an unsaturated bond further polymerizes with a cross-linking agent to form a cross-linking hydrophilic core, wherein the cross-linking agent has unsaturated bonds. The hydrophilic monomer comprising an unsaturated bond further comprises a cross-linking hydrophilic shell for enclosing the hydrophilic core or the cross-linking hydrophilic core, wherein the cross-linking hydrophilic shell is formed by polymerization of a hydrophilic monomer comprising an unsaturated bond and another cross-linking agent, wherein the other cross-linking agent has unsaturated bonds.

The present invention further provides a biocide-encapsulated microcapsule for use in paint and a method of producing the biocide-encapsulated microcapsule, comprising: a hydrophilic core formed by polymerization of a first hydrophilic monomer comprising an unsaturated bond; a hydrophilic co-crosslinking shell adapted to enclose the hydrophilic core and formed by copolymerization of the first hydrophilic monomer and a second hydrophilic monomer comprising an unsaturated bond; and a biocide being a hydrophobic compound, wherein the hydrophilic core and the hydrophilic co-crosslinking shell enclose the dispersed biocide to effect storage and releases of the biocide. The hydrophilic core is formed by polymerization of the first hydrophilic monomer in the presence of a free radical initiator with a first hydrophilic monomer conversion rate of 20-80% after the introduction of the second hydrophilic monomer, a cross-linking agent and a remaining portion of the first hydrophilic monomer to undergo copolymerization, so as to form the hydrophilic co-crosslinking shell. The biocide is introduced before the free radical initiator begins to work or when the first hydrophilic monomer conversion rate is 20-80%, so as to produce the biocide-encapsulated microcapsule.

The monomer conversion rate of the present invention is defined as the rate at which monomers are consumed as a result of polymerization thereof in the presence of free radicals. According to the present invention, in the presence of free radicals, the initial speed of polymerization is higher than the terminal speed of polymerization, and then the ongoing polymerization sees monomers decreasing as they are turning into polymers; in other words, the monomer conversion rate, expressed in percentage, states how many monomers have turned into polymers. The relationship between the monomer conversion rate and reaction time is shown in FIG. 2, which shows that the conversion rate rises slowly from the beginning but quickly thereafter indicative of a growth phase characterized by rapid consumption of monomers and an ensuing slowdown of the monomer conversion rate. According to the present invention, a first monomer with an appropriate conversion rate, coupled with a second monomer, is effective in controlling the degree of polymerization of a polymeric material which the microcapsule core and shell are made of.

The hydrophobic monomer, preferably styrene, comprises one or more unsaturated bonds, and the unsaturated bonds include double bonds and triple bonds, susceptible to attacks from free radicals and thus likely to undergo polymerization. The biocide comprises at least a hydrophobic compound or a combination thereof with water solubility of less than 2 wt % (preferably less than 1 wt %), for example, 2-octyl-3(2H)-isothiazolone (OIT), benzisothiazolin (BIT), 4,5-dichloro-2-n-octyl-3(2H)-isothiazolone (DCOIT), or any other alkane, preferably DCOIT. The free radical initiator consists of free radicals capable of initiation when illuminated or heated and is potassium persulfate, benzoyl peroxide or azodiisobutyrodinitrile, preferably potassium persulfate. The cross-linking agent has at least two or more unsaturated bonds, and the unsaturated bonds include double bonds and triple bonds, susceptible to attacks from free radicals and thus likely to undergo polymerization. The cross-linking agent is divinylbenzene, 1,4-butanediol diacrylate or a combination thereof, preferably divinylbenzene. The hydrophilic monomer has one or more unsaturated bonds, and the unsaturated bonds include double bonds and triple bonds, susceptible to attacks from free radicals and thus likely to undergo polymerization. The hydrophilic monomer is methyl methacrylate (MMA), methyl acrylate, acrylic acid, or a combination thereof, preferably MMA.

Regarding the biocide-encapsulated microcapsules of the present invention, a hydrophobic biocide present in an aqueous-phase system tends to combine with whatever hydrophobic polymer, and in consequence the biocide is enclosed by the polymeric microcapsule core. Hence, according to the present invention, a hydrophobic monomer undergoes polymerization to form a hydrophobic core, thereby stabilizing and enclosing the hydrophobic biocide. According to the present invention, a hydrophilic monomer undergoes polymerization to form a hydrophilic shell (also known as hydrophilic wall) for enclosing the original hydrophobic core to prevent the hydrophobic core and the hydrophobic biocide therein from coming into contact with a low-polarity organic solvent contained in the paint, because their contact with the organic solvent will cause the core or biocide to dissolve rapidly and thus be released massively.

The present invention provides a biocide-encapsulated microcapsule for use in paint. The microcapsule is characterized in that: (1) single-stage or multi-stage polymerization and cross-linking is carried out to allow concentrated biocide to be enclosed by a microcapsule core; (2) the biocide-encapsulated microcapsule comprises a hydrophobic biocide which does not dissolve in an aqueous solution and thus is not released massively to the surroundings; (3) the core of microcapsules of the present invention is made of a hydrophobic polymer formed by polymerization of hydrophobic monomers or a polymer compound with a hydrophobic end group (such as a long hydrocarbon chain) to effectuate stabilization and massive storage of the hydrophobic biocide; (4) the shell of microcapsules of the present invention is made of a hydrophilic polymer formed by polymerization of hydrophilic monomers to prevent rapid releases of the hydrophobic biocide, because the hydrophilic polymeric shell serves as a shield which prevents the hydrophobic biocide from coming into contact with the solvent contained in the paint; (5) depending on needs, an appropriate amount of the cross-linking agent is introduced to undergo polymeric cross-linking with the microcapsules' polymeric core or shell, with a view to enhancing structural stability of the microcapsules' polymeric core or shell and enhancing insolubility of the solvent in the paint; and (6) adjusting cross-linking agent content to therefore regulate the extent of the cross-linking of the microcapsules' polymeric core or shell, thereby controlling the releases of the biocide otherwise enclosed by the microcapsules.

The above summary, the detailed description below, and the accompanying drawings further explain the technical means and measures taken to achieve predetermined objectives of the present invention and the effects thereof. The other objectives and advantages of the present invention are explained below and illustrated with the accompanying drawings.

DETAILED DESCRIPTION OF THE PREFERRED EMBODIMENTS

A detailed description of fine features and advantages of the present invention is given below so that every person skilled in the art can understand the advantages of the present invention, implement the technical contents of the present invention and readily comprehend the objectives thereof by reviewing the disclosure of the present specification, the appended claims, and the accompanying drawings.

A biocide-encapsulated microcapsule for use in paint according to the present invention is produced by polymerization and cross-linking of polymers in a single stage or multiple stages such that a concentrated biocide is enclosed by a microcapsule core to prevent massive releases of the biocide to the surroundings. Furthermore, the biocide of the present invention is hydrophobic (i.e., not soluble in any aqueous solution) and thus unlikely to be quickly, massively released to the surroundings.

Figure 1:
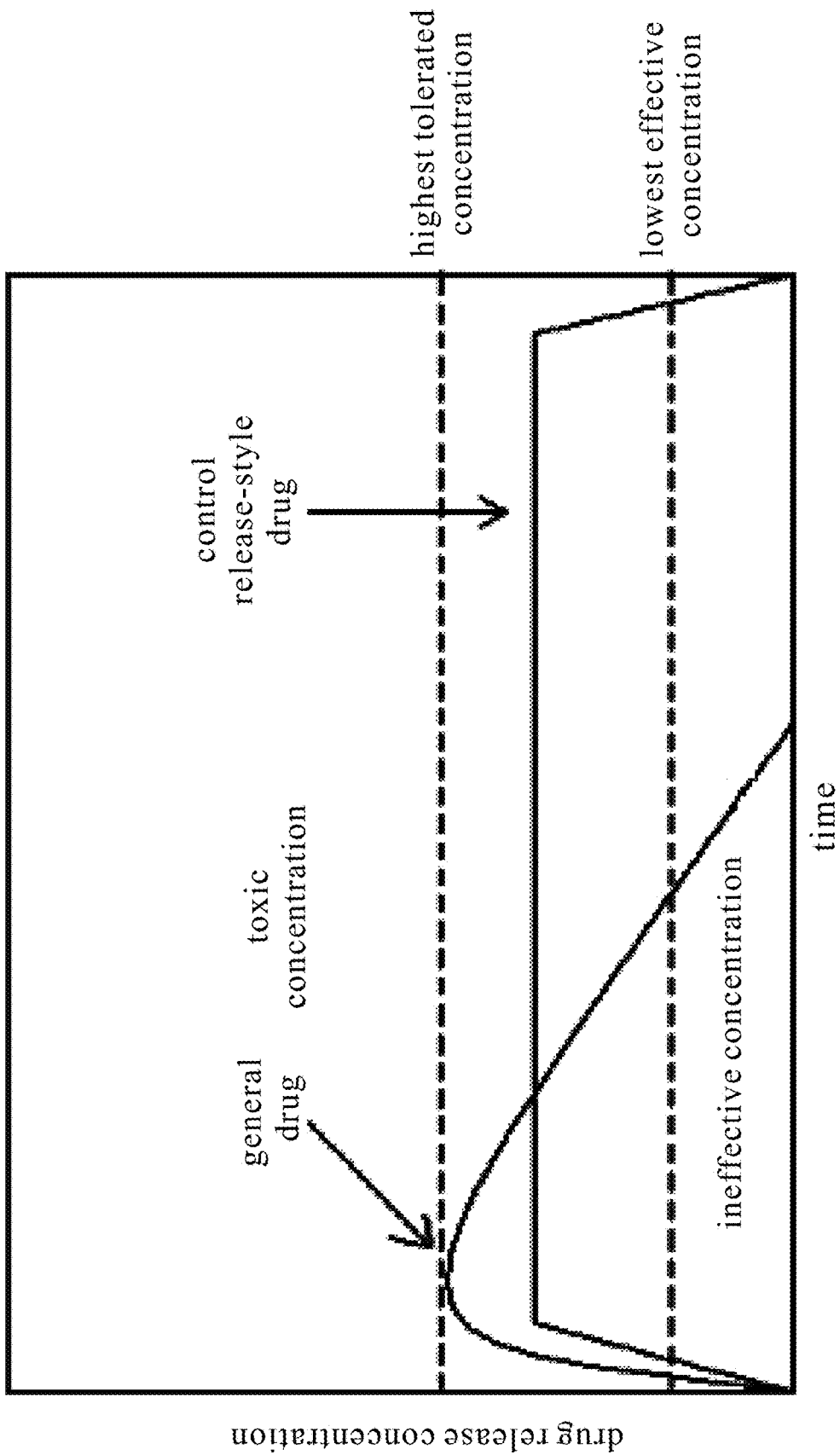
FIG. 1 (PRIOR ART) are graphs of drug release concentration against time.
Figure 2:
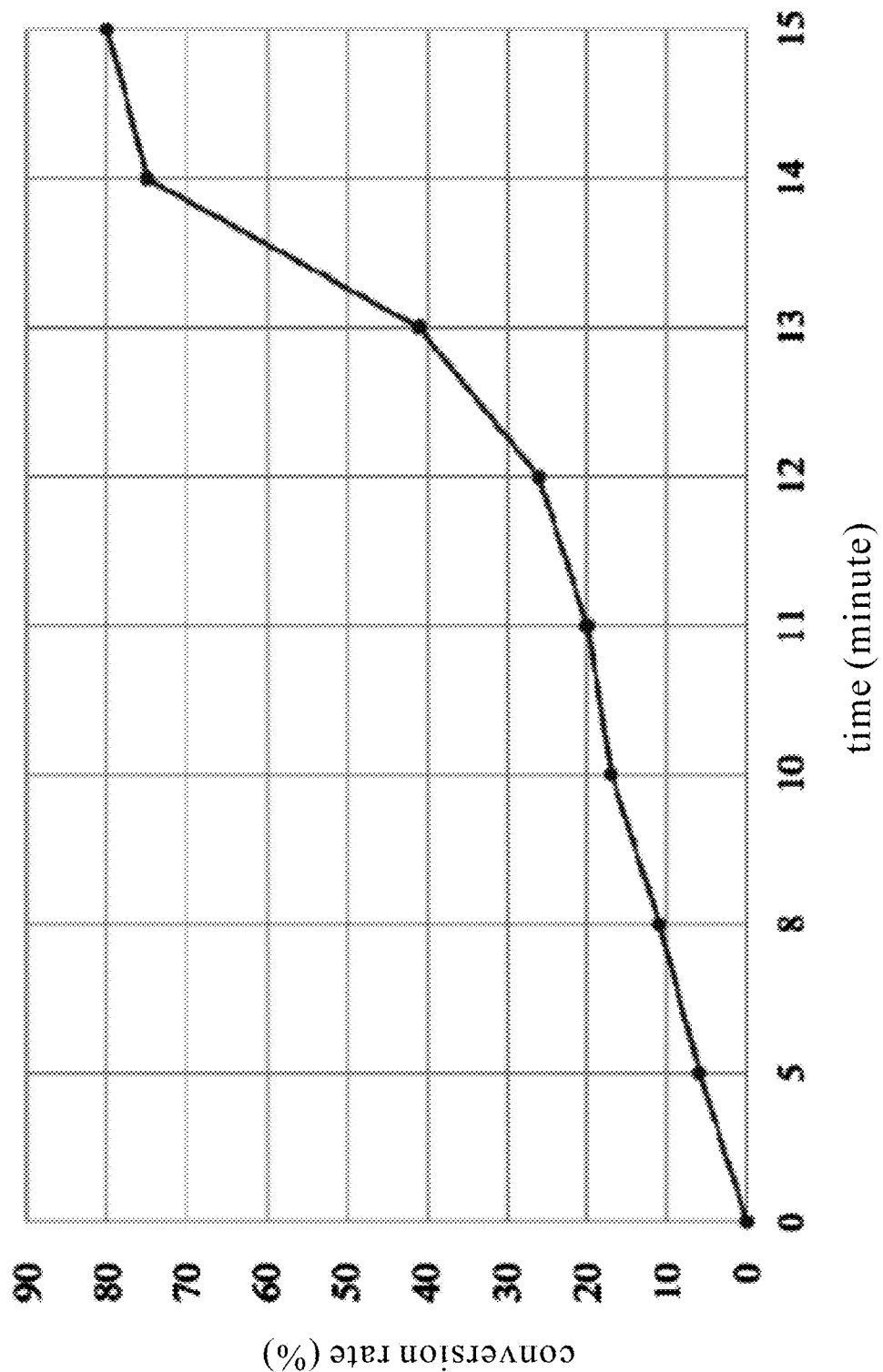
FIG. 2 is a graph of conversion rate against time.
Figure 3:
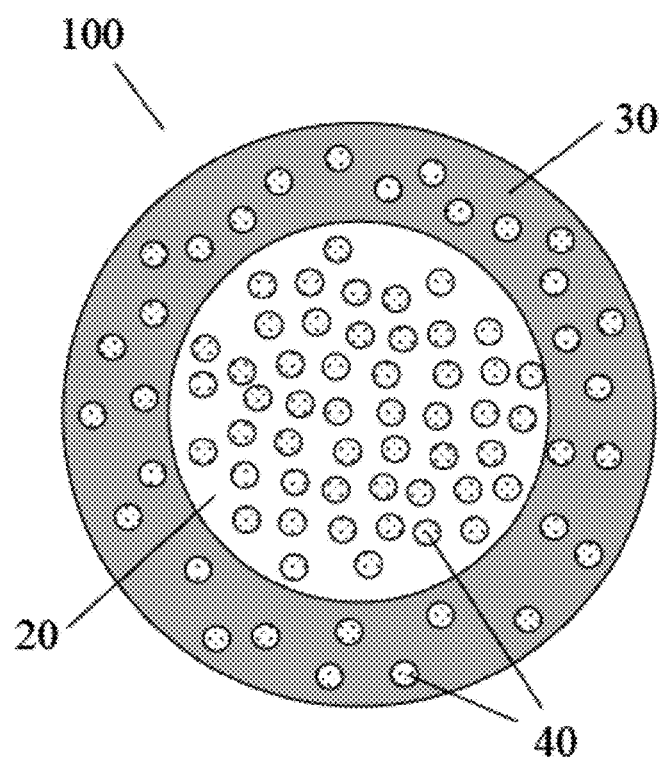
FIG. 3 is a schematic view of a biocide-encapsulated microcapsule according to an embodiment of the present invention.

Referring to FIG. 3, there is shown a schematic view of a biocide-encapsulated microcapsule according to an embodiment of the present invention. As shown in the diagram, a biocide-encapsulated microcapsule 100 for use in paint according to an embodiment of the present invention, comprising: a hydrophobic core 20 formed by polymerization of a hydrophobic monomer comprising an unsaturated bond in presence of a free radical initiator; a cross-linking hydrophilic shell 30 adapted to enclose the hydrophobic core 20 and formed by polymerization of a hydrophilic monomer comprising an unsaturated bond and another cross-linking agent having unsaturated bonds; and a biocide 40 being a hydrophobic compound. The hydrophobic core 20 and the cross-linking hydrophilic shell 30 enclose the dispersed biocide 40 to effect storage and releases of the biocide.

The hydrophobic core 20 is formed by polymerization of a hydrophobic monomer comprising an unsaturated bond in presence of a free radical initiator. Afterward, a cross-linking agent and a hydrophilic monomer having an unsaturated bond undergo polymerization to form a hydrophilic cross-linking shell for enclosing the hydrophobic core. Finally, the biocide 40 is introduced into the hydrophilic cross-linking shell and the hydrophobic core to produce the biocide-encapsulated microcapsule 100.

In an embodiment of the present invention, with the hydrophobic monomer being polymerized in an aqueous solution to form a microcapsule core, free radicals in the aqueous solution are less effective in attacking the unsaturated bonds of the hydrophobic monomer, and in consequence the free radicals (produced by the initiator) in the aqueous solution disappear spontaneously before beginning to attack the unsaturated bonds of the hydrophobic monomer. Hence, to effect polymerization of the hydrophobic monomer, it is feasible to introduce a small amount (a maximum 5%) of hydrophilic monomer, such as acrylic acid, into the aqueous solution to increase the points of monomer attack available in the aqueous, so as to enhance the efficiency of polymerization of the hydrophobic monomer.

Embodiment 1A: Biocide Microcapsules Enclosed by a Hydrophobic Core

Introduce 10 g of styrene, 0.5 g of acrylic acid, and 8.57 g of biocide DCOIT into a two-neck round-bottom flask. Then, deionized water was introduced into the flask until the total weight of the solution therein reached 100 g. Afterward, put the flask in an oil bath to begin reflux. After the solution had started to boil, 0.13 g of potassium persulfate was added to the solution, and then the reaction took place for two hours. At the end of the reaction, the solution underwent a centrifugal separation process to remove a supernatant. At last, the resultant solution was left undisturbed and dried at room temperature to produce biocide microcapsules enclosed by a hydrophobic core.

Embodiment 1B: Biocide Microcapsules Enclosed by a Hydrophobic Core 10 g of styrene and around 0.5 g of acrylic acid were heated in an aqueous solution until it boiled. Then, 0.13 g of potassium persulfate was added to the solution to undergo free radical polymer polymerization to form a polymer hydrophobic embryo. Afterward, biocide DCOIT was added to the solution to undergo microencapsulation. At the end of the reaction, the solution underwent a centrifugal separation process to remove a supernatant. At last, the resultant solution was left undisturbed and dried at room temperature to produce biocide microcapsules enclosed by a hydrophobic core.

Embodiment 2: Biocide Microcapsules Enclosed by a Cross-Linking Hydrophobic Core The objective of Embodiment 2 is to effect a cross-linking reaction of a cross-linking agent divinylbenzene and styrene. Introduce 10 g of styrene, around 0.5 g of acrylic acid, 8.57 g of biocide DCOIT, and 2 g of divinylbenzene into a two-neck round-bottom flask. Then, deionized water was introduced into the flask until the total weight of the solution therein reached 100 g. Afterward, put the flask in an oil bath to begin reflux. After the solution had started to boil, 0.13 g of potassium persulfate was added to the solution, and then the reaction took place for two hours. At the end of the reaction, the solution underwent a centrifugal separation process to remove a supernatant. At last, the resultant solution was left undisturbed and dried at room temperature to produce biocide microcapsules enclosed by a cross-linking hydrophobic core. The objective of Embodiment 2 is to effect cross-linking and thereby polymerization of a cross-linking agent and a monomer to produce a cross-linking polymer; hence, no required sequence of the introduction of the cross-linking agent and the biocide to undergo a reaction is necessary, thereby allowing Embodiment 2 to fall within the scope of the embodiment.

Embodiment 3A: Biocide Microcapsules Enclosed by a Cross-Linking Hydrophilic Shell/Hydrophobic Core The experimental steps of Embodiment 1A or 1B were carried out such that biocide microcapsules enclosed by a hydrophobic core were formed to function as a microcapsule core. Then, 8 g of methyl methacrylate (MMA), 2 g of divinylbenzene and 0.13 g of potassium persulfate were added to a reactant solution. Allow the reaction to take place for 1.5 hours so that the 8 g of methyl methacrylate (MMA), 2 g of divinylbenzene and 0.13 g of potassium persulfate underwent polymerization to form a cross-linking hydrophilic shell for enclosing the hydrophobic core. At the end of the reaction, the solution underwent a centrifugal separation process to remove a supernatant. At last, the resultant solution was left undisturbed and dried at room temperature to produce biocide microcapsules enclosed by a cross-linking hydrophilic shell/hydrophobic core. The objective of Embodiment 3A is to introduce a hydrophilic monomer and a cross-linking agent for enclosing the original hydrophobic core; hence, all equivalent embodiments of the present invention fall within the scope of the embodiment.

Embodiment 3B: Biocide Microcapsules Enclosed by a Cross-Linking Hydrophilic Shell/Cross-Linking Hydrophobic Core The experimental steps of Embodiment 2 were carried out such that biocide microcapsules enclosed by a cross-linking hydrophobic core were produced to function as a microcapsule core. Then, 8 g of MMA, 2 g of divinylbenzene, and 0.13 g of potassium persulfate were added to a reactant solution. Allow the reaction to take place for 1.5 hours. Afterward, the resultant solution underwent a centrifugal separation process and was dried to produce biocide microcapsules enclosed by a cross-linking hydrophilic shell/cross-linking hydrophobic core.

Embodiment 4A: Biocide Microcapsules Enclosed by a Hydrophilic Core 10 g of MMA and 8.57 g of biocide DCOIT were introduced into a two-neck round-bottom flask. Then, deionized water was introduced into the flask until the total weight of the solution therein reached 100 g. Afterward, put the flask in an oil bath to begin reflux. After the solution had started to boil, 0.13 g of potassium persulfate was added to the solution, and then the reaction took place for two hours. At the end of the reaction, the solution underwent a centrifugal separation process to remove a supernatant. At last, the resultant solution was left undisturbed and dried at room temperature to produce biocide microcapsules enclosed by a hydrophilic core.

Embodiment 4B: Biocide Microcapsules Enclosed by a Hydrophilic Core 10 g of MMA was heated and boiled in an aqueous solution. Then, 0.13 g of potassium persulfate was added to the solution to undergo a free radical polymer polymerization reaction and thus form a polymer hydrophilic embryo. Afterward, biocide DCOIT was added to the solution to undergo microencapsulation, thereby falling within the scope of the embodiment.

Embodiment 5: Biocide Microcapsules Enclosed by a Cross-Linking Hydrophilic Core The objective of Embodiment 5 is to effect a cross-linking reaction of the cross-linking agent divinylbenzene and MMA. 10 g of MMA, 8.57 g of biocide DCOIT, and 2 g of divinylbenzene were introduced into a two-neck round-bottom flask. Then, deionized water was introduced into the flask until the total weight of the solution therein reached 100 g. Afterward, put the flask in an oil bath to begin reflux. After the solution had started to boil, 0.13 g of potassium persulfate was added to the solution, and then the reaction took place for two hours. At the end of the reaction, the solution underwent a centrifugal separation process to remove a supernatant. At last, the resultant solution was left undisturbed and dried at room temperature to produce biocide microcapsules enclosed by a cross-linking hydrophilic core. The objective of Embodiment 5 is to effect cross-linking and thereby polymerization of a cross-linking agent and a monomer to form a cross-linking polymer, and thus no required sequence is necessary for the introduction of the cross-linking agent and the biocide to trigger the reaction, thereby allowing Embodiment 5 to fall within the scope of the embodiment.

Embodiment 6A: Biocide Microcapsules Enclosed by a Cross-Linking Hydrophilic Shell/Hydrophilic Core The experimental steps of Embodiment 5A or 5B were carried out such that biocide microcapsules enclosed by a hydrophilic core were formed to function as a microcapsule core. Then, 8 g of MMA, 2 g of divinylbenzene, and 0.13 g of potassium persulfate were added to the reactant solution. Allow the reaction to take place for 1.5 hours such that polymerization occurred to produce a cross-linking hydrophilic shell for enclosing the hydrophilic core. At the end of the reaction, the solution underwent a centrifugal separation process to remove a supernatant. The resultant solution was left undisturbed and dried at room temperature to produce biocide microcapsules enclosed by a cross-linking hydrophilic shell/hydrophilic core. The objective of Embodiment 6A is to introduce a hydrophilic monomer and a cross-linking agent for enclosing the original hydrophilic core; hence, all equivalent embodiments of the present invention fall within the scope of the embodiment.

Embodiment 6B: Biocide Microcapsules Enclosed by a Cross-Linking Hydrophilic Shell/Cross-Linking Hydrophilic Core The experimental steps of Embodiment 6 were carried out such that biocide microcapsules enclosed by a cross-linking hydrophilic core were formed to function as a microcapsule core. Then, 8 g of MMA, 2 g of divinylbenzene, and 0.13 g of potassium persulfate were added to the reactant solution. Allow the reaction to take place for 1.5 hours to produce biocide microcapsules enclosed by a cross-linking hydrophilic shell/cross-linking hydrophilic core.

Embodiment 7: Biocide Microcapsules Enclosed by a Hydrophilic Co-Crosslinking Shell/Hydrophilic Core 10 g of MMA and 8.57 g of biocide DCOIT were introduced into a two-neck round-bottom flask. Then, deionized water was introduced into the flask until the total weight of the solution therein reached 100 g. Afterward, put the flask in an oil bath to begin reflux. After the solution had started to boil, 0.13 g of potassium persulfate was added to the solution to undergo a free radical polymer polymerization reaction. The reaction took 10-30 minutes (with a hydrophilic monomer polymer conversion rate of 20-80%). At this point in time, a hydrophilic core had formed in the solution, but the solution still contained unreacted free radicals. Again, 8 g of MMA and 2 g of divinylbenzene were introduced to react for 1.5 hours. Then, MMA monomer was introduced to undergo copolymerization with a remaining portion of the MMA monomer in the solution, so as to form a hydrophilic co-crosslinking shell. At the end of the reaction, the solution underwent a centrifugal separation process to remove a supernatant. At last, the resultant solution was left undisturbed and dried at room temperature to produce biocide microcapsules enclosed by a hydrophilic co-crosslinking shell/hydrophilic core, wherein the biocide was dispersed and enclosed in the hydrophilic core and the hydrophilic co-crosslinking shell. The objective of Embodiment 7 is to introduce a hydrophilic monomer, a cross-linking agent, and a portion of hydrophilic monomer added in advance to undergo a co-crosslinking process and thus form a hydrophilic co-crosslinking shell for enclosing the original hydrophobic core. Hence, no required sequence of the introduction of the biocide to trigger the reaction is necessary. The biocide may be introduced along with the belated MMA monomer, and thus they are attributed to equivalent implementation of the present invention, thereby falling within the scope of the embodiment.

Embodiment 8: Thermogravimetric Analysis of Microcapsules

Figure 4:
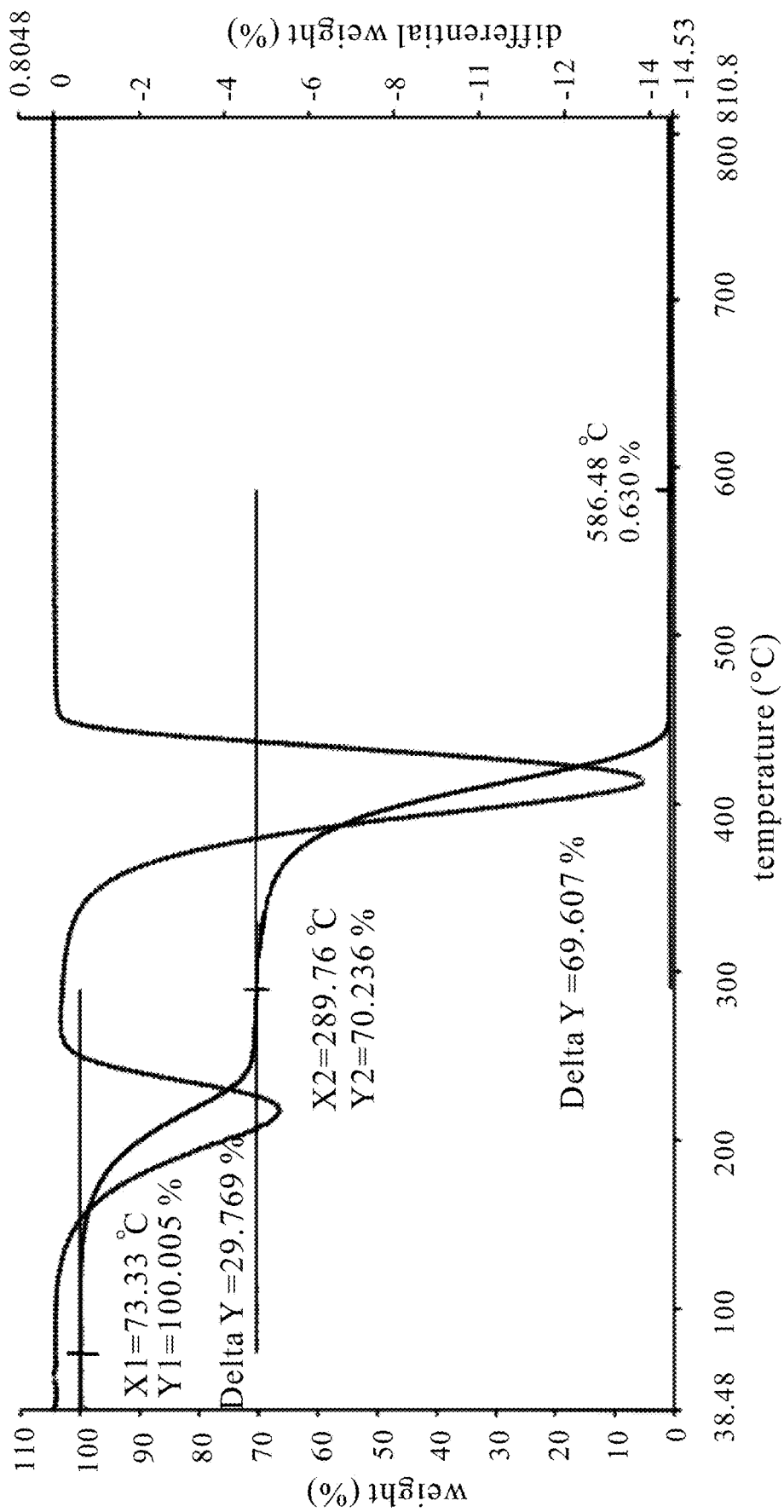
FIG. 4 are graphs of thermogravimetric analysis of biocide-encapsulated microcapsules according to an embodiment of the present invention.

Referring to FIG. 4, there are shown graphs of thermogravimetric analysis of biocide-encapsulated microcapsules according to an embodiment of the present invention. As indicated by the graphs, regarding the biocide microcapsules enclosed by a cross-linking hydrophilic shell/hydrophobic core according to Embodiment 3A of the present invention, its biocide DCOIT content is 30 wt % (thermogravimetric loss below 250° C.), whereas the polymer content is 70 wt % (thermogravimetric loss from 250° C. to 600° C.), which proves that high-concentration biocide microcapsules enclosed by a cross-linking hydrophilic shell/hydrophobic core had been produced.

Embodiment 9: Release Test Conducted on Biocide-Encapsulated Microcapsules

Embodiment 9 is about a release test experiment conducted on biocide-encapsulated microcapsules. Dip biocide-encapsulated microcapsule samples of Embodiment 1, 3A in toluene, an organic solvent, at a proportion of 5 wt % for one day. Replace the old organic solvent with a new organic solvent of the same volume as the old organic solvent. Then, the biocide-encapsulated microcapsule samples were dipped for two more days. Afterward, the organic solvent was taken out to undergo pyrolysis gas chromatography mass spectrometry (PyGC/MS), and the result is shown in Table 1. In Embodiment 1, no hydrophilic shell encloses the hydrophobic core, and thus the hydrophobic biocide (DCOIT) was released quickly. In Embodiments 3A, 4, the hydrophobic biocide DCOIT is enclosed by a cross-linking hydrophilic shell and thus released slowly and sparsely. Therefore, the biocide-encapsulated microcapsules of the present invention control the releases of biocide through modification of the hydrophobic core and the hydrophilic shell.

TABLE 1

Release test conducted on biocide-encapsulated microcapsules

| | Embodiment | | | |
|---|---|---|---|---|
| | 1 | | 3A | |
| | microcapsule dipping duration | | | |
| | 1 day | 3 days | 1 day | 3 days |
| PMMA characteristic peak concentration | − | − | − | − |
| PS characteristic peak concentration | ++ | ++ | + | + |
| DCOIT characteristic peak concentration | +++ | +++ | ++ | ++ |

Legend:
−: absent
+: low concentration
++: moderate concentration
+++: high concentration

Embodiment 11: Biocide-Encapsulated Microcapsules for Use in Paint and Test

In Embodiment 11, the biocide-encapsulated microcapsules of the present invention were mixed with a paint such that the paint is capable of preventing biofouling. Mix 5% microcapsules and commercially available paint according to doses of paint and painting behavior. If the microcapsules are not miscible with the paint and thus do not disperse uniformly therein, it will be feasible to adjust the amount of a diluting agent in use or resort to a physical means, such as a three-roller technique, such that the microcapsules can disperse uniformly in the paint.

Figure 5:
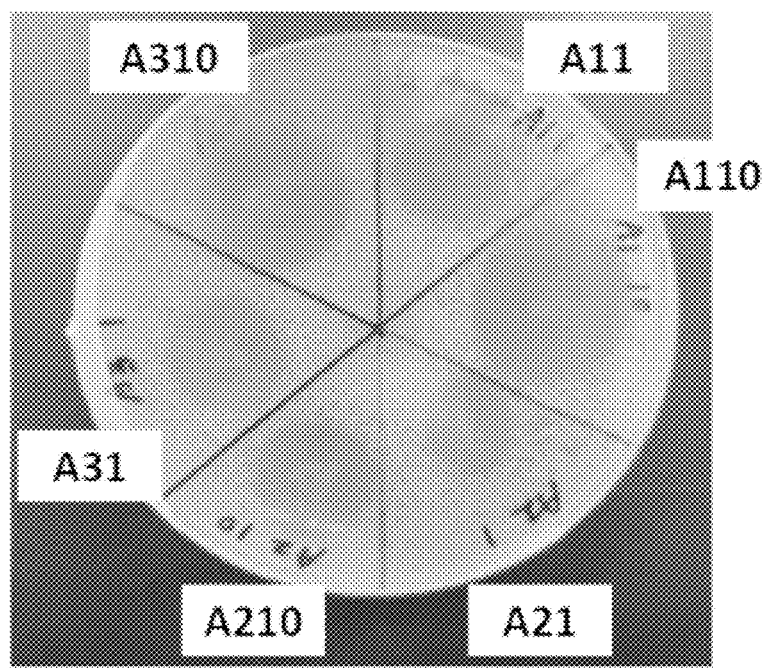
FIG. 5 shows pictures taken of inhibition zones on a paint coating which contains biocide-encapsulated microcapsules according to an embodiment of the present invention.

A coating process was performed uniformly on the microcapsule-containing paint on samples with a square coater. Upon completion of the coating process, the samples were left undisturbed at room temperature for 7 days to dry the paint on the samples. After the paint on the samples had been dried, the experiment began and involved scraping dry paint coatings off the samples and then conducting an antibacterial assay on 10 mg of the dry paint coatings and 1 mg of the dry paint coatings, using *Pseudoalteromonas* sp. (sbt), and the result is shown in Table 2. The experiment was intended to conduct an antibacterial assay on the microcapsule-containing paint with reference to inhibition zones displayed thereon. During the experiment, the microcapsule-containing paint coating samples were each centrally positioned to develop the inhibition zones thereon, because the microcapsule-containing paint coating samples release the biocide therefrom gradually. High antibacterial efficacy is indicated by large inhibition zones. Referring to FIG. 5, there are shown pictures taken of inhibition zones on a paint coating which contains biocide-encapsulated microcapsules according to Embodiment 11 of the present invention. As shown in the pictures, the area of inhibition zones increases with the concentration of the biocide-encapsulated microcapsules of the present invention in the paint, which proves that the biocide-encapsulated microcapsules of the present invention can be introduced into paint to provide antifouling paint.

TABLE 2

Experiment Conducted on Inhibition Zones

| | Embodiment | |
|---|---|---|
| Dose | 2 | 3A |
| 1 mg | A11 | A21 |
| 10 mg | A110 | A210 |

Embodiment 12: Maritime Exposure Experiment of Microcapsule-Containing Paint Coating Mix 1% microcapsules and commercially available paint according to doses of paint and painting behavior. Coat the microcapsule-containing paint on a stainless steel substrate by rolling, brushing, or spraying. The painted stainless steel substrate was left undisturbed at room temperature for 7 days or more until the paint dries. Afterward, the substrate was dipped in seawater (so that the substrate reached a depth around 1 meter below sea level) at Port Kaohsiung, Taiwan to undergo a maritime exposure experiment for one month.

A month later, the substrate with a microcapsule-containing paint coating was taken out, observed and compared with a substrate not covered by any microcapsule-containing paint coating. The findings are as follows: the substrate with a microcapsule-containing paint coating is free of any green alga, but the substrate not covered by any microcapsule-containing paint coating is not. The findings of the experiment show that the microcapsule-containing paint coating prevents biofouling for at least one month.

A biocide-encapsulated microcapsule for use in paint according to an embodiment of the present invention is produced by polymerization and cross-linking of polymers in a single stage or multiple stages such that a concentrated biocide is enclosed by a microcapsule core to prevent massive releases of the biocide to the surroundings. Furthermore, the biocide of the present invention is hydrophobic (i.e., not soluble in any aqueous solution) and thus unlikely to be quickly, massively released to the surroundings. The biocide-encapsulated microcapsule of the present invention effects persistent, efficient releases of the biocide from paint, prevents biofouling, enhances cost-effectiveness, and saves energy, thereby having high applicability.

Although the present invention is disclosed above by preferred embodiments in terms of its features and advantages, the preferred embodiments are not restrictive of the present invention. Changes and modifications made by persons skilled in the art to the preferred embodiments without departing from the spirit and scope of the present invention must be deemed falling within the scope of the present invention. Accordingly, the legal protection for the present invention should be defined by the appended claims.

What is claimed is:

1. A biocidal microcapsule for use in paint, comprising:
   a hydrophobic core formed by polymerization of styrene and acrylic acid in the presence of a free radical initiator;
   a cross-linking hydrophilic shell adapted to enclose the hydrophobic core; and
   a biocide being a hydrophobic compound,
   wherein the hydrophobic core encloses the dispersed biocide to effect storage and release of the biocide, and
   wherein the biocide is 4,5-dichloro-2-n-octyl-3(2H)-isothiazolone (DCOIT),
   wherein the cross-linking hydrophilic shell is formed by polymerization of methyl methacrylate (MMA) and divinylbenzene.

2. The biocidal microcapsule of claim 1, wherein the styrene and acrylic acid further polymerizes in presence of a first cross-linking agent to form a cross-linking hydrophobic core, with the first cross-linking agent having unsaturated bonds.

3. The biocidal microcapsule of claim 2, wherein the first cross-linking agent is divinylbenzene.

4. The biocidal microcapsule of claim 1, wherein the free radical initiator is one selected from the group consisting of potassium persulfate, benzoyl peroxide, and azodiisobutyrodinitrile.

\* \* \* \* \*